US010169078B2

(12) United States Patent
Bailey et al.

(10) Patent No.: US 10,169,078 B2
(45) Date of Patent: Jan. 1, 2019

(54) MANAGING THREAD EXECUTION IN A MULTITASKING COMPUTING ENVIRONMENT

(71) Applicant: International Business Machines Corporation, Armonk, NY (US)

(72) Inventors: Christopher N. Bailey, Southampton (GB); Oliver M. Deakin, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/884,990

(22) Filed: Oct. 16, 2015

(65) Prior Publication Data

US 2017/0109196 A1    Apr. 20, 2017

(51) Int. Cl.
| | |
|---|---|
| *G06F 9/46* | (2006.01) |
| *G06F 9/48* | (2006.01) |
| *G06F 9/50* | (2006.01) |
| *G06F 9/52* | (2006.01) |

(52) U.S. Cl.
CPC ............ *G06F 9/485* (2013.01); *G06F 9/5038* (2013.01); *G06F 9/526* (2013.01)

(58) Field of Classification Search
None
See application file for complete search history.

(56) References Cited

U.S. PATENT DOCUMENTS

| | | | |
|---|---|---|---|
| 7,278,141 B2 | 10/2007 | Accapadi et al. | |
| 8,034,739 B2 | 9/2011 | Lewis | |
| 8,166,480 B2 | 4/2012 | Fontenot et al. | |
| 8,578,079 B2 | 11/2013 | de Cesare et al. | |
| 8,732,307 B1 | 5/2014 | Zhu et al. | |
| 2003/0212701 A1 | 11/2003 | Beavin et al. | |
| 2006/0277551 A1* | 12/2006 | Accapadi | G06F 9/5077 718/107 |
| 2007/0226739 A1 | 9/2007 | Dodge et al. | |
| 2009/0138890 A1 | 5/2009 | Blake et al. | |
| 2009/0217282 A1* | 8/2009 | Rai | G06F 11/3452 718/104 |
| 2011/0055479 A1 | 3/2011 | West et al. | |
| 2011/0099551 A1 | 4/2011 | Fahrig et al. | |
| 2012/0053722 A1 | 3/2012 | Keyser et al. | |
| 2013/0103641 A1 | 4/2013 | Rehman | |
| 2015/0254108 A1 | 9/2015 | Kurtzman et al. | |

OTHER PUBLICATIONS

Blagodurov, Sergey, et al.; "Contention-Aware Scheduling on Multicore Systems"; Simon Fraser University; ACM Transactions on Computer Systems; vol. 28; No. 4; Article 8; pp. 1-45; Publication Date: Dec. 2010.

Johnson, Ryan, et al.; "Decoupling contention management from scheduling"; 2010 Article.

(Continued)

*Primary Examiner* — Tammy E Lee
(74) *Attorney, Agent, or Firm* — Edward J. Wixted, III

(57) ABSTRACT

A thread in a computing system is processed for execution of instructions to perform an action. The action is one of the following: accessing a shared resource or executing a critical section of code. A schedule of the thread is managed. The management prevents suspension of the thread during execution of the action.

3 Claims, 4 Drawing Sheets

(56) References Cited

OTHER PUBLICATIONS

Vallejo, Enrique et al.; "Towards fair, scalable, locking"; pp. 1-6; Captured Mar. 25, 2015; EPHAM '08; Apr. 6, 2008; Boston, Massachussetts; Copyright 2008; pp. 1-6; <https://www.google.co.uk/?gws_rd=ssl#q=Towards+fair%2C+scalable%2C+locking>.
"Scheduling (computing)";Wikipedia, the free encyclopedia; Printed Apr. 2, 2015; <http://en.wikipedia.org/wiki/Scheduling_(computing)>.
Xian, Feng, et al.; "Contention-Aware Scheduler: Unlocking Execution Parallelism in Multithreaded Java Programs"; Department of Computer Science & Engineering; University of Nebraska-Lincoln; Lincoln, NE; pp. 1-17; OOPSLA '08; Oct. 19-23, 2008; Copyright 2008.
Bailey et al., "Managing Thread Execution in a Multitasking Computing Environment", U.S. Appl. No. 15/014,312, filed Feb. 3, 2016.
Appendix P—List of IBM Patents or Patent Applications Treated as Related, 2 Pages.

* cited by examiner

MANAGING THREAD EXECUTION IN A MULTITASKING COMPUTING ENVIRONMENT

BACKGROUND OF THE INVENTION

The present invention relates generally to the field of computer resource allocation, and more particularly to thread scheduling in a virtual computing environment.

A thread is a sequence of computer program instructions that can be carried out, or executed, by a computer processor. Threads typically must access various resources, for example data within a portion of memory, in order to execute. In a virtual computer environment, multiple threads may be executed concurrently and typically must share the same resources. Often, where one thread access a shared resource, for example a portion of memory, the thread does so to the exclusion of all other threads. In other words, only one thread may access a particular resource at a time. Additionally, a single computer processor may only execute one thread at a time. To help ensure efficient operation in such a virtual computing environment, an operating system may employ a method of managing the execution of threads.

SUMMARY

Embodiments of the present invention include a method, computer program product, and system for managing thread execution. In one embodiment, a thread in a computing system is processed for execution of instructions to perform an action. The action is one of the following: accessing a shared resource or executing a critical section of code. A schedule of the thread is managed. The management prevents suspension of the thread during execution of the action.

DETAILED DESCRIPTION

Embodiments of the present invention recognize that virtualized, multithreaded computing environments require thread execution management in order to maintain operational efficiency. Resource sharing is a necessary consequence of a virtualized, multithreaded computing environment, and that units of execution, such as threads, are regularly suspended from execution as a result of other threads contending for the same resource. Embodiments of the present invention further recognize that threads may become suspended from further execution where they have executed for a period of time greater than their processor usage allowance.

Embodiments of the present invention recognize that where a synchronization mechanism, such as a lock, is used with a shared resource, the thread that owns the lock has access to the resource to the exclusion of all other threads, even where the owner thread has been suspended, which prevents other active threads from accessing the shared resource for an indefinite period of time. Embodiments of the present invention further recognize that where a thread is executing code that is critical to the performance of the computing system (i.e., a critical section of code), suspension of the thread during that time can impact the performance and responsiveness of the computing system.

Embodiments of the present invention provide two related approaches for a thread scheduling mechanism that avoids suspension of threads that are executing while owning a contended shared resource or during performance critical sections of code. The first approach involves scheduling a thread to continue executing by accumulating processor usage debt where it would otherwise be descheduled, and subsequently repaying the processor usage debt after either releasing the contended shared resource or exiting the critical section of code. The second approach involves determining the amount of processor usage required for a thread to access and release a shared resource (or enter and exit a critical section of code) prior to allowing the thread to own the shared resource or enter the critical section of code.

Figure 1:
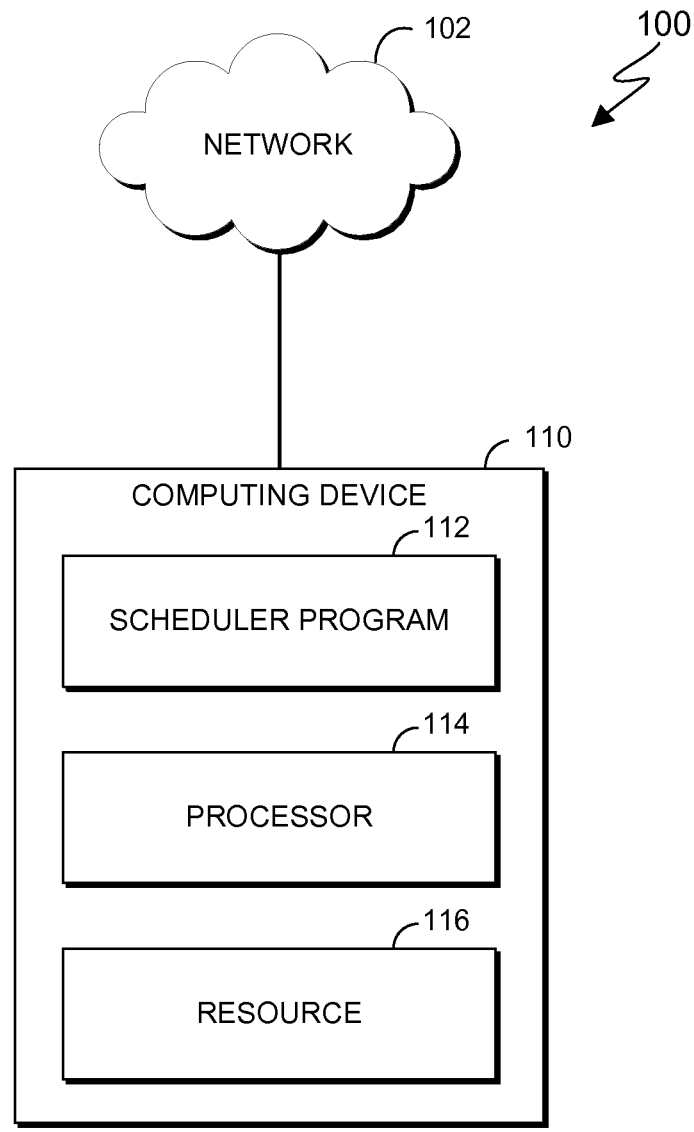
FIG. 1 is a functional block diagram of a distributed data processing environment, in accordance with an embodiment of the present invention.

The present invention will now be described in detail with reference to the Figures. FIG. 1 is a functional block diagram illustrating distributed data processing environment 100, in accordance with an embodiment of the present invention. FIG. 1 is presented for illustrative purposes and does not imply any limitations with regard to the environments in which embodiments of the present invention may be implemented.

In the illustrated embodiment, distributed data processing environment 100 includes computing device 110. In general, computing device 110 is any electronic device or combination of electronic devices capable of executing computer readable program instructions and communicating with any computing device within distributed data processing environment 100. For example, computing device 110 may be a workstation, personal computer, laptop computer, tablet, personal digital assistant, or mobile phone. In an embodiment, computing device 110 may be a computer system utilizing clustered computers and components (e.g., database server computers, application server computers) that act as a single pool of seamless resources when accessed by elements of distributed data processing environment 100, such as in a cloud computing environment. In the illustrated embodiment, computing device 110 includes scheduler program 112, processor 114, and resource 116.

In an embodiment, computing device 110 may access and communicate with other computing devices (not shown) through network 102. Network 102 may be a local area network (LAN), a telecommunications network, a wide area network (WAN) such as the Internet, or any combination of the three, and can include wired, wireless, or fiber optic connections. In general, network 102 can be any combination of connections and protocols that will support communications between computing device 110 and any other computing device connected to network 102, in accordance with an embodiment of the present invention.

In an embodiment, scheduler program 112 may be a computer program, application, or subprogram of a larger program, such as an operating system, that communicates with processor 114 and resource 116, in accordance with an embodiment of the present invention. In an embodiment, scheduler program 112 manages the allocation of resources, including allocating resource 116 to various threads, and the execution of various threads by processor 114.

In an embodiment, a thread may be any sequence of instructions capable of execution by processor 114 and capable of management by scheduler program 112. For example, scheduler program 112 may instruct processor 114 to execute (schedule) a thread, to stop execution of (suspend, or deschedule) a thread, and to continue the execution of (reschedule) a suspended thread.

In an embodiment, a thread may include a critical section of code. A critical section may be any section of code that is critical to the performance of the computing system. For example, a critical section may include instructions to utilize or modify a resource shared by multiple threads such as a printer or a block of data. In an embodiment, the start and end of a critical section may be defined through markers in the program code.

In the illustrated embodiment, scheduler program 112 is located on computing device 110 and may access and communicate with processor 114 and resource 116 directly. In an alternative embodiment, scheduler program 112 may be located on another networked computer (not shown), and scheduler program 112 may access and communicate with processor 114 and resource 116 through network 102.

Figure 3:
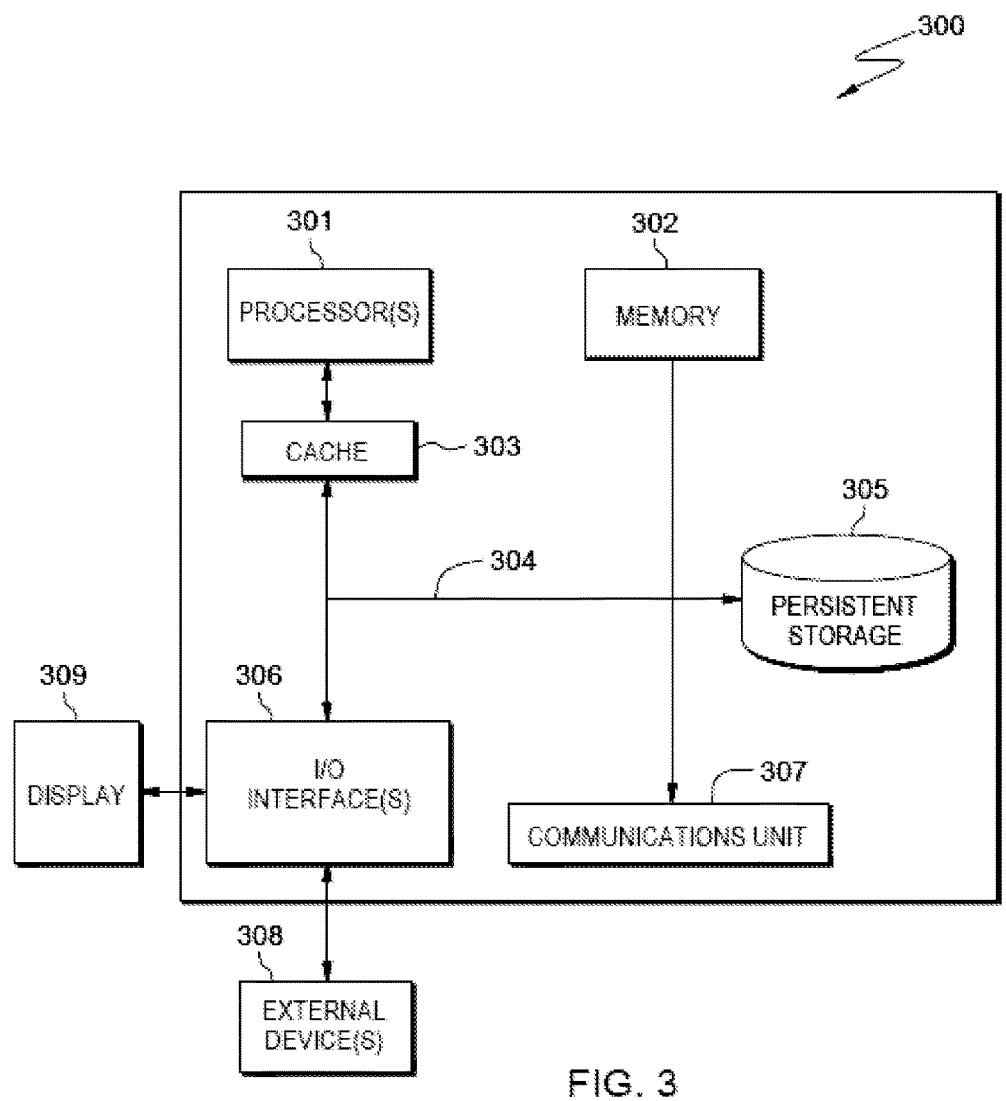
FIG. 3 is a block diagram of components of the computing device of FIG. 1, in accordance with an embodiment of the present invention.

In an embodiment, processor 114 is a component within a computer system that issues and executes tasks (e.g., instructions of threads). In an embodiment, processor 114 may be processor(s) 301 as shown in FIG. 3. In an embodiment, processor 114 is capable of issuing and executing instructions out-of-order. In an embodiment, processor 114 exists in a virtual computing environment whereby processor 114 may execute multiple units of execution (e.g., threads) concurrently over a period of time. In an embodiment, processor 114 comprises a single integrated circuit processor, which includes various units of execution, registers, buffers, memories, and other functional units that are formed by integrated circuitry. In an embodiment, processor 114 may include more than one processor.

In an embodiment, resource 116 may be any physical or virtual component of limited availability in a computer system. For example, resource 116 may be a block (or address) of random access memory (RAM), disk storage, cache memory, an internal bus, an external device, or processor time. Resource 116 may operate in a virtual computing environment in which multiple independent threads may share access to resource 116 simultaneously or concurrently over a period of time.

In an embodiment, resource 116 may operate in conjunction with a mechanism that restricts access to resource 116. For example, resource 116 may operate in conjunction with a lock, or other synchronization mechanism, which permits only one thread (owner thread) to access resource 116 at a time, and any other thread attempting to access resource 116 (contending thread) is blocked from access and suspended from further execution until the owner thread is no longer accessing resource 116. In other words, until the owner thread no longer owns the lock associated with resource 116. Where the execution of an owner thread of a lock for resource 116 has been suspended, any contending thread is also blocked and suspended until the owner thread is rescheduled and completes execution of those instructions that require access to resource 116.

Figure 2A:
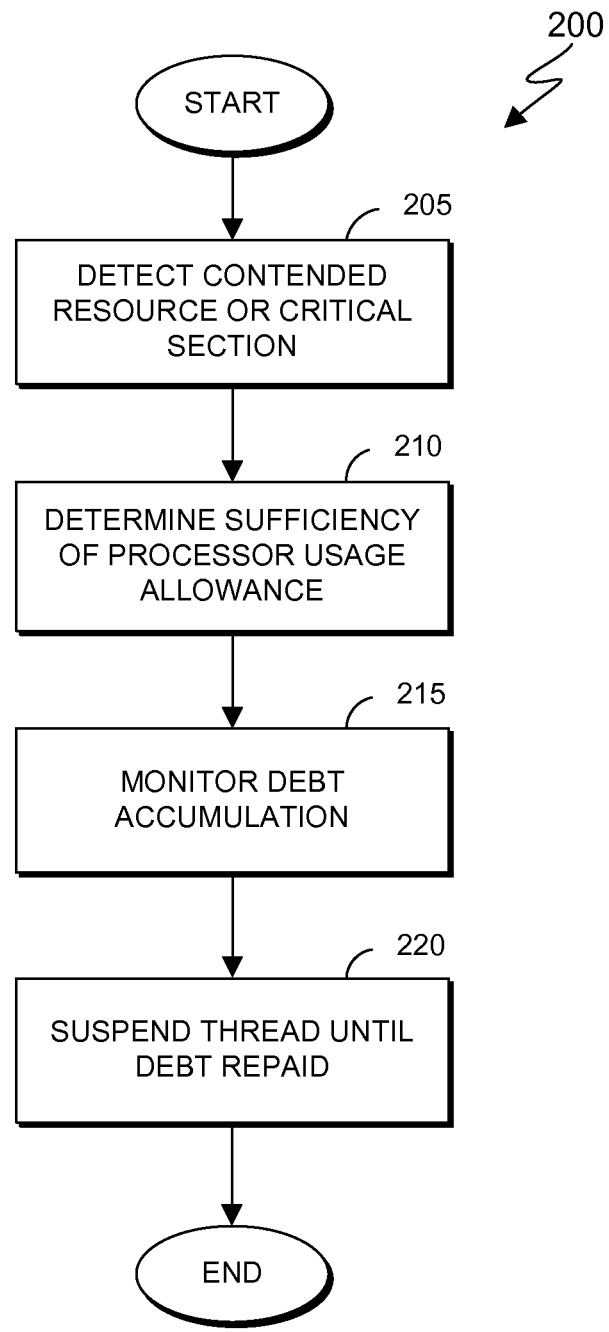
FIG. 2A is a flowchart illustrating operational steps for managing thread execution in a virtual computing environment using processor usage debt, in accordance with an embodiment of the present invention.

FIG. 2A is a flowchart of workflow 200 illustrating operational steps for managing thread execution in a multitasking computing environment using processor usage debt, in accordance with an embodiment of the present invention. In the illustrated embodiment, the steps of the workflow are performed by scheduler program 112. In an alternative embodiment, the steps of the workflow can be performed by any other program(s) while working with scheduler program 112. In the illustrated embodiment, resource 116 includes a lock which restricts access to resource 116 (i.e., the RAM, disk storage, cache memory, etc.).

Scheduler program 112 detects a contended resource or a critical section (step 205). In other words, in an embodiment, scheduler program 112 detects a thread (contending thread) attempting to access resource 116 that is presently being accessed by another thread (the thread). In an alternative embodiment, scheduler program 112 detects a thread (the thread) executing instructions within a performance critical section of code.

Scheduler program 112 determines if there is sufficient processor usage allowance to continue execution (step 210). In other words, scheduler program 112 determines if the executing thread has sufficient processor usage allowance to continue executing. In an embodiment, processor usage allowance of a thread may be expressed as a percentage of processor time that a thread spends executing as a percentage of the processor's total execution capacity. In an alternative embodiment, processor usage allowance of a thread may be expressed as the time a thread spends executing in relation to a certain time period (e.g. a thread may be allowed 10 seconds of execution time during any given 60 second time period).

In an embodiment, scheduler program 112 determines whether the amount of time processor 114 has spent executing the thread is within the processor usage allowance of the thread, as discussed previously. In an alternative embodiment, where the thread is one of multiple threads that together make up a larger process, scheduler program 112 determines whether the amount of time processor 114 has spent executing the process (i.e., the sum of the processing times for each thread of the process) is within the processing time allowed for the process as a whole.

Scheduler program 112 monitors debt accumulation (step 215). In an embodiment, the processor usage debt of a thread is the amount of time for which processor 114 executes the thread while the thread is the owner of a contended resource 116 (i.e., there is a contending thread attempting to access the same resource or lock owned by the thread) and while the thread has insufficient processor usage allowance to continue execution. In an alternative embodiment, the processor usage debt of a thread is the amount of time for which processor 114 executes a critical section of the thread and while the thread has insufficient processor usage allowance to continue execution. Where scheduler program 112 determines there is insufficient processor usage allowance to continue execution, rather than suspending execution of the thread, scheduler program 112 instructs processor 114 to continue executing the thread, and scheduler program 112 monitors the amount of processor usage debt accumulated by the thread.

Scheduler program 112 suspends execution until debt is repaid (step 220). In other words, scheduler program 112 suspends execution of the thread until the processor usage debt accumulated in step 215 is repaid back to the computing system. While the thread is suspended, processor 114 may continue to execute other threads. In an embodiment, scheduler program 112 determines that the processor usage debt of the thread is repaid where processor 114 executes other threads for an amount of time equal to the amount of processor usage debt the thread accumulated in step 215. In an embodiment, scheduler program 112 suspends execution of the thread when resource 116 is no longer contended or, alternatively, when the thread has completed executing the critical section of code.

Figure 2B:
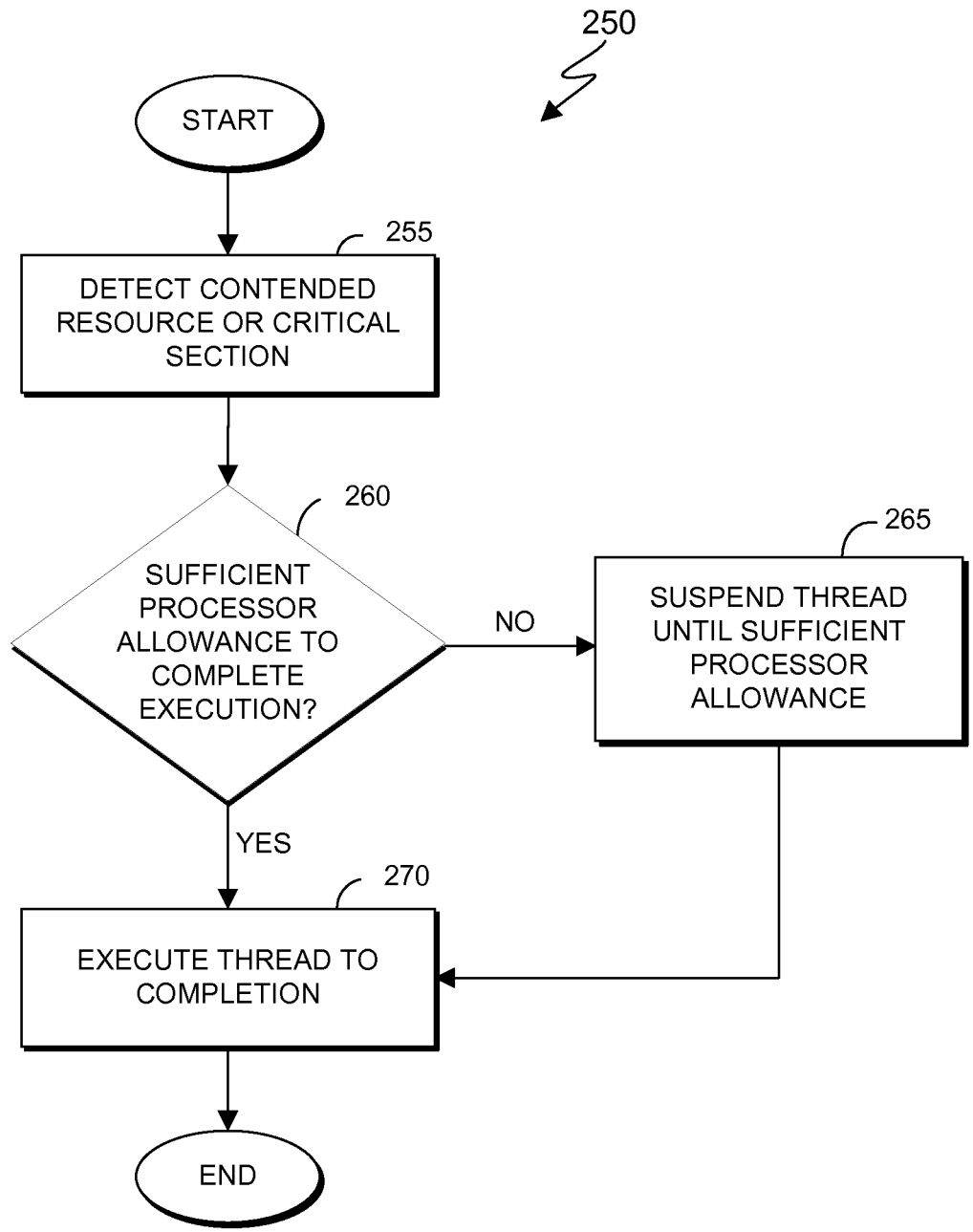
FIG. 2B is a flowchart illustrating operational steps for managing thread execution in a virtual computing environment by predicting the required processor usage for a thread, in accordance with an embodiment of the present invention.

FIG. 2B is a flowchart of workflow 250 illustrating operational steps for managing thread execution in a virtual computing environment by pre-determining the required processor usage for a thread, in accordance with an embodiment of the present invention. In an embodiment, the steps of the workflow are performed by scheduler program 112. In an alternative embodiment, steps of the workflow can be performed by any other program while working with scheduler program 112.

Scheduler program 112 detects a contended resource or a critical section (step 255). In other words, in an embodiment, scheduler program 112 detects (e.g., through receiving a request) a thread (the thread) attempting to access resource 116. Where resource 116 is not presently being accessed by another thread, scheduler program 112 proceeds to decision block 260. In an embodiment, where resource 116 is presently being accessed by another thread (owner thread), and execution of the owner thread has been suspended, scheduler program 112 instructs processor 114 to complete execution of the owner thread. In this manner, the thread is not waiting for resource 116 indefinitely while the descheduled owner thread prevents access to resource 116. In an alternative embodiment, scheduler program 112 detects (e.g., through receiving a request) a thread (the thread) attempting to begin execution of a performance critical section of code.

Scheduler program 112 determines if the thread has sufficient processor usage allowance to complete execution (decision block 260). In other words, in an embodiment, scheduler program 112 determines if the thread has sufficient processor usage allowance to completely execute its instructions that require access to resource 116. In an alternative embodiment, scheduler program 112 determines if the thread has sufficient processor usage allowance to completely execute all instructions within the performance critical section of code.

In an embodiment, scheduler program 112 determines the sufficiency of processor usage allowance for the thread by comparing the processor usage allowance of the thread with the processor usage predicted to be actually used by the thread during execution while accessing contended resource 116 or, alternatively, during execution of the critical section of code. In an embodiment, the processor usage may be predicted for the thread based on the processor usage (and/or processor usage debt) previously determined for the same thread in accordance with the debt monitoring step (step 215 of workflow 200). In an alternative embodiment, where the same thread has not been previously monitored, the processor usage may be predicted for the thread based on the processor usage (and/or processor usage debt) previously determined for a similar thread in accordance with the debt monitoring step (step 215 of workflow 200). Scheduler program 112 may determine a previously monitored thread to be similar to the thread by comparing features such as the type of resource 116 accessed or modified (e.g., RAM, or a particular memory address), the amount of instructions the thread contains, and features of the thread instructions themselves such as particular functions (e.g., an "average" function repeatedly appearing). In an embodiment, scheduler program 112 continuously revises and updates the predicted processor usage for various threads as threads are executed and monitored in accordance with workflow 200 or workflow 250.

If scheduler program 112 determines that the thread does not have sufficient processor usage allowance to complete execution (decision block 260, no branch), then scheduler program 112 suspends execution of the thread until the thread has sufficient processor usage allowance to complete execution (step 265).

If scheduler program 112 determines that the thread has sufficient processor usage allowance to complete execution (decision block 260, yes branch), then scheduler program 112 instructs processor 114 to execute the thread to completion (step 270). In other words, scheduler program 112 allows the thread to complete executing instructions that require access to contended resource 116 or, alternatively, to complete executing instructions within the critical section of code. In an embodiment, where processor 114 executes the thread beyond the processor usage allowance of the thread (e.g., where the actual processor usage required by the thread is greater than the processor usage predicted in decision block 260), scheduler program 112 may instruct the thread to continue execution and may monitor processor usage debt thereafter accumulated by the thread in accordance with workflow 200.

FIG. 3 depicts computer 300, which illustrates an example of a system that includes scheduler program 112, processor 114, and resource 116. Computer 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing thread execution, the method comprising:
   predicting, by one or more computer processors, an amount of processor usage that would be used by a thread in a computing system for execution of a critical section of code, where the critical section of code is defined by a starting marker and an ending marker in a program code that contains the critical section of code;
   determining that the thread has a sufficient processor usage allowance to execute the critical section of code to completion; and
   in response to determining that the thread has sufficient processor usage allowance to execute the critical section of code to completion:
      scheduling, by one or more computer processors, the thread for execution of the critical section of code;
      receiving, by one or more computer processors, a request to deschedule the thread, wherein the request is made in response to determining that the thread has insufficient processor usage allowance to continue execution;
      responsive to receiving a request to deschedule the thread, scheduling, by one or more computer processors, the thread to complete execution of the critical section of code;
      responsive to scheduling the thread to complete execution, determining, by one or more computer processors, processor usage debt accumulated by the thread;
      determining that the thread has completed execution of the critical section of code;
      responsive to determining that the thread has completed execution of the critical section of code, suspending the thread; and
      preventing further execution of the thread until after the processor has executed one or more other threads for an amount of time equal to the amount of processor usage debt accumulated by the thread;
   wherein:
      the predicted amount of processor usage is a percentage of total execution capacity of the processor that the thread is predicted to use during execution of the critical section of code;
      the processor usage debt comprises an amount of time for which the thread is executing while the thread has both insufficient processor usage allowance to continue execution and is executing the critical section of code; and
      the one or more computer processors are one or more field programmable gate arrays.

2. A computer program product for managing thread execution, the computer program product comprising:
   one or more computer readable storage media; and
   program instructions stored on the one or more computer readable storage media, the program instructions comprising:
      program instructions to predict, by one or more computer processors, an amount of processor usage that would be used by a thread in a computing system for execution of a critical section of code, where the critical section of code is defined by a starting marker and an ending marker in a program code that contains the critical section of code;
      program instructions to determine that the thread has a sufficient processor usage allowance to execute the critical section of code to completion; and
   in response to determining that the thread has sufficient processor usage allowance to execute the critical section of code to completion:
      program instructions to schedule the thread for execution of the critical section of code;
      program instructions to receive a request to deschedule the thread, wherein the request is made in response to determining that the thread has insufficient processor usage allowance to continue execution;
      responsive to receiving the request to deschedule the thread, program instructions, to schedule the thread to complete execution of the critical section of code;
      responsive to scheduling the thread to complete execution, program instructions, to determine processor usage debt accumulated by the thread;
      program instructions to determine that the thread has completed execution of the critical section of code;
      responsive to determining that the thread has completed execution of the critical section of code, program instructions to suspend the thread; and
      program instructions to prevent further execution of the thread until after the processor has executed one or more other threads for an amount of time equal to the amount of processor usage debt accumulated by the thread;
   wherein:
      the predicted amount of processor usage is a percentage of total execution capacity of the processor that the thread is predicted to use during execution of the critical section of code;
      the processor usage debt comprises an amount of time for which the thread is executing while the thread has both insufficient processor usage allowance to continue execution and is executing the critical section of code; and the one or more computer processors are one or more field programmable gate arrays.

3. A computer system for managing thread execution, the computer system comprising:
one or more computer processors;
one or more computer readable storage media; and
program instructions, stored on the one or more computer readable storage media, for execution by at least one of the one or more computer processors, the program instructions comprising:
program instructions to predict, by one or more computer processors, an amount of processor usage that would be used by a thread in a computing system for execution of a critical section of code, where the critical section of code is defined by a starting marker and an ending marker in a program code that contains the critical section of code;
program instructions to determine that the thread has a sufficient processor usage allowance to execute the critical section of code to completion; and
in response to determining that the thread has sufficient processor usage allowance to execute the critical section of code to completion:
program instructions to schedule the thread for execution of the critical section of code;
program instructions to receive a request to deschedule the thread, wherein the request is made in response to determining that the thread has insufficient processor usage allowance to continue execution;
responsive to receiving the request to deschedule the thread, program instructions, to schedule the thread to complete execution of the critical section of code;
responsive to scheduling the thread to complete execution, program instructions, to determine processor usage debt accumulated by the thread;
program instructions to determine that the thread has completed execution of the critical section of code;
responsive to determining that the thread has completed execution of the critical section of code, program instructions to suspend the thread; and
program instructions to prevent further execution of the thread until after the processor has executed one or more other threads for an amount of time equal to the amount of processor usage debt accumulated by the thread;
wherein:
the predicted amount of processor usage is a percentage of total execution capacity of the processor that the thread is predicted to use during execution of the critical section of code;
the processor usage debt comprises an amount of time for which the thread is executing while the thread has both insufficient processor usage allowance to continue execution and is executing the critical section of code; and
the one or more computer processors are one or more field programmable gate arrays.

* * * * *